US012762974B2

(12) United States Patent
Lin

(10) Patent No.: US 12,762,974 B2
(45) Date of Patent: Oct. 13, 2026

(54) TRAINING SYSTEM FOR HEMORRHAGE TREATMENT

(71) Applicant: Aix International Ltd., New Taipei City (TW)

(72) Inventor: Yu-Cheng Lin, New Taipei City (TW)

(73) Assignee: AIX INTERNATIONAL LTD., New Taipei City (TW)

( * ) Notice: Subject to any disclaimer, the term of this patent is extended or adjusted under 35 U.S.C. 154(b) by 262 days.

(21) Appl. No.: 18/610,162

(22) Filed: Mar. 19, 2024

(65) Prior Publication Data

US 2025/0078683 A1 Mar. 6, 2025

(30) Foreign Application Priority Data

Aug. 28, 2023 (TW) ................................ 112209165

(51) Int. Cl.
*G09B 23/30* (2006.01)

(52) U.S. Cl.
CPC ................................ *G09B 23/303* (2013.01)

(58) Field of Classification Search
CPC ................................ G09B 23/303
See application file for complete search history.

(56) References Cited

U.S. PATENT DOCUMENTS 7,887,330 B2 * 2/2011 King .................... G09B 23/303 434/268
10,885,813 B2 * 1/2021 Krummenacher ..... G09B 23/30
11,468,794 B2 * 10/2022 Lara-Gutierrez .... G09B 23/303
11,495,143 B2 * 11/2022 Segall .................... G09B 23/30
11,600,200 B2 * 3/2023 Hare .................... A41D 13/129
11,817,007 B2 * 11/2023 Eggert .................. G09B 23/28
2007/0243512 A1 * 10/2007 King .................... G09B 23/303 434/268
2007/0292829 A1 * 12/2007 King ...................... G09B 23/34 434/262
2019/0378436 A1 * 12/2019 Krummenacher ..... G09B 23/30
2021/0201699 A1 * 7/2021 Eggert ................. G09B 23/281
2023/0035936 A1 * 2/2023 Bates ................... G09B 23/281
2023/0154356 A1 * 5/2023 Williams ............. G09B 23/303 434/268
2025/0078683 A1 * 3/2025 Lin ...................... G09B 23/303

* cited by examiner

*Primary Examiner* — Xuan M Thai
*Assistant Examiner* — Sadaruz Zaman
(74) *Attorney, Agent, or Firm* — Leong C. Lei

(57) ABSTRACT

The training system for hemorrhage treatment includes a control element, pulse width modulation (PWM) element, relay, motor element, water flow sensor element, water pressure sensor element, Bluetooth element, power supply, water reservoir, and simulated body. The control element controls the PWM element and receive signals from the water flow sensor element and water pressure sensor element. The PWM element receives control signals from the control element and sends them to the relay. The relay controls the operation of the motor element. The motor element transports fluid according to the control signals. The water flow sensor element detects flow rate, and the water pressure sensor element detects pressure values. The Bluetooth element is connected to the control element to facilitate mutual communication with a mobile device. This system simulates wound bleeding, enables emergency medical trainees to practice accurate hemostasis, provides feedback on correct operation, and achieves hemostatic effectiveness.

2 Claims, 2 Drawing Sheets

TRAINING SYSTEM FOR HEMORRHAGE TREATMENT

BACKGROUND OF THE INVENTION

(a) Technical Field of the Invention

The present invention generally relates to hemorrhage treatment, and more particularly to a training system capable of simulating wound bleeding for medical rescue trainees.

(b) Description of the Prior Art

Regardless of accidents such as collisions, amputations, gunshot wounds, cuts, punctures, etc., victims often to go into shock or die due to excessive bleeding or ineffective hemostasis, resulting in high casualty rates from traumatic bleeding accidents. Therefore, in addition to reducing the occurrence of accidents, it is crucial for medical personnel and healthcare providers to improve successful hemostasis for traumatic wounds and reduce incidents of excessive bleeding.

Various companies have designed practice kits for packing and hemostasis, wearable hemostasis practice kits, trauma simulators, etc., for training, simulation, and teaching systems to enable trainees to practice proper hemostasis. However, it has been found that most of these hemostasis practice and simulation systems use water to simulate blood, with mostly single motor conveyance, resulting in a fixed simulated bleeding volume that cannot simulate arterial or venous bleeding. Moreover, due to the fixed motor speed, it cannot simulate intermittent bleeding caused by the victim's real heartbeat frequency, resulting in monotonous practice modes that do not match real-life situations.

Furthermore, as the water in these systems must be manually poured back for reuse after each hemostasis practice, it cannot be automatically circulated for continuous use. If the water is depleted during training, trainees must pause to refill it, leading to interruptions in practice. In particular, these simulation and practice systems lack pressure and flow sensing elements, making it difficult for trainees to accurately determine whether adequate pressure is being applied for successful hemostasis. This leads to situations where trainees may not perform procedures accurately, resulting in ineffective hemostasis when rescuing real victims, leading to incidents of continued excessive bleeding.

Additionally, since these simulation systems do not have pulse simulation devices, trainees cannot confirm whether the pulse in the hemostasis state is correctly stopped and ceased beating during tourniquet practice. Therefore, these simulation systems have deficiencies in simulation, making it difficult for trainees to achieve optimal training results, which need to be improved.

SUMMARY OF THE INVENTION

An objective of the present invention is to improve the shortcomings of the above simulation system, providing a training system for hemorrhage treatment capable of simulating wound bleeding, enabling emergency medical trainees to practice accurate hemostasis, providing feedback on correct operation, and achieving hemostatic effectiveness.

To achieve the objective, the training system includes a control element, pulse width modulation (PWM) element, relay, motor element, water flow sensor element, water pressure sensor element, Bluetooth element, power supply, water reservoir, and simulated body.

The control element is electrically connected to the PWM element, water flow sensor element, water pressure sensor element, Bluetooth element, and power supply. The control element outputs control signals to the PWM element and receive signals transmitted by the water flow sensor element and the water pressure sensor element. The control element utilizes the Bluetooth element to mutually exchange signals with a mobile device.

The PWM element is electrically connected to the control element, relay, and power supply. The PWM element is used to receive control signals transmitted by the control element and to transmit the control signals to the relay.

The relay is electrically connected to the PWM element, motor element, and power supply. The relay is used to receive control signals transmitted by the PWM element and to control the motor element's operation based on the control signals.

The motor element is electrically connected to the relay and power supply. The motor element is also connected to the simulated body via a water supply pipe. The motor element transports fluid to the simulated body based on the control signals from the relay to simulate bleeding effects.

The water flow sensor element is electrically connected to the control element and power supply. The water flow sensor is used to detect a flow rate of the water supply pipe connected to the motor element and to transmit a detected flow rate signal back to the control element.

The water pressure sensor element is electrically connected to the control element and power supply. The water pressure sensor element is used to detect a pressure value of the water supply pipe connected to the motor element and to transmit a detected pressure signal back to the control element.

The Bluetooth element is electrically connected to the control element and power supply. The Bluetooth element is used to facilitate mutual communication and signal transmission between the control element and the mobile device, and The power supply is electrically connected to the control element, PWM element, relay, motor element, water flow sensor element, water pressure sensor element, and Bluetooth element to provide electrical power.

With the above structure, the training system provides a means to simulate wound bleeding, enabling emergency medical trainees to practice accurate hemostasis, providing feedback on correct operation, and achieving the hemostatic effectiveness.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
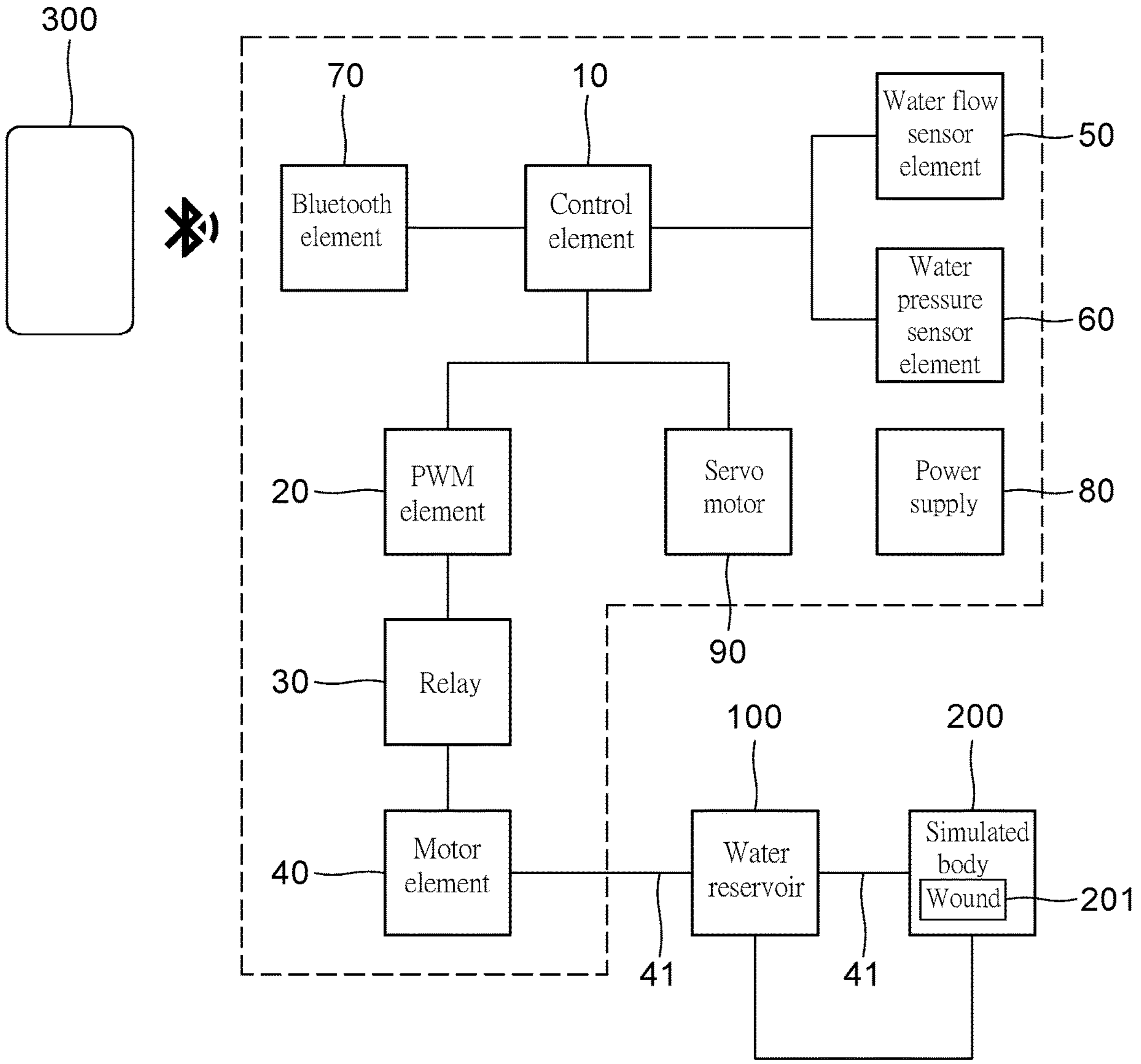
FIG. 1 is a functional block diagram showing a training system for hemorrhage treatment according to the present invention.
Figure 2:
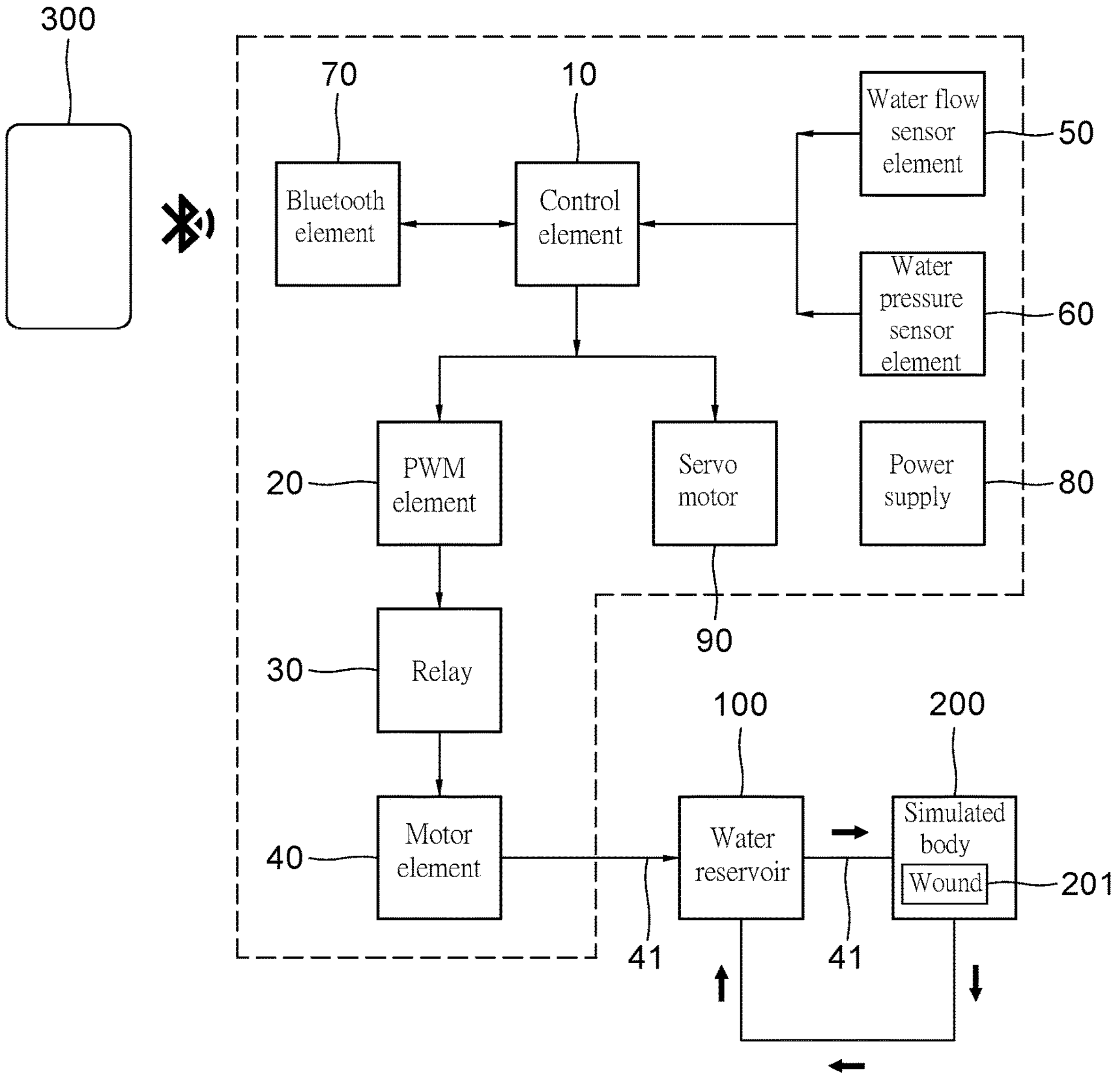
FIG. 2 is a schematic diagram showing an operation scenario of the training system for hemorrhage treatment of FIG. 1.

As shown in FIGS. 1 and 2, a training system for hemorrhage treatment according to the present invention is described in details as follows.

As shown in FIG. 1, the training system for hemorrhage treatment includes a control element 10, a pulse width modulation (PWM) element 20, a relay 30, a motor element 40, a water flow sensor element 50, a water pressure sensor element 60, a Bluetooth element 70, a power supply 80, a water reservoir 100, and a simulated body 200.

The control element 10 is electrically connected to the PWM element 20, water flow sensor element 50, water pressure sensor element 60, Bluetooth element 70, and power supply 80. The control element 10 outputs control signals to the PWM element 20 and can receive signals transmitted by the water flow sensor element 50 and the water pressure sensor element 60. Additionally, the control element 10 utilizes the Bluetooth element 70 to mutually exchange signals with a mobile device 300.

The PWM element 20 is electrically connected to the control element 10, relay 30, and power supply 80. The PWM element 20 is used to receive control signals transmitted by the control element 10 and to transmit these control signals to the relay 30.

The relay 30 is electrically connected to the PWM element 20, motor element 40, and power supply 80. The relay 30 is used to receive control signals transmitted by the PWM element 20 and to control the operation of the motor element 40 based on these control signals.

The motor element 40 is electrically connected to the relay 30 and power supply 80. The motor element 40 is also connected to the water reservoir 100 and simulated body 200 via a water supply pipe 41. The motor element 40 can transport fluid from the water reservoir 100 to the simulated body 200 based on control signals from the relay 30 to simulate bleeding effects. Additionally, the fluid outputted by the simulated body 200 can be recirculated and transported back to the water reservoir 100.

The water flow sensor element 50 is electrically connected to the control element 10 and power supply 80. It is used to detect the flow rate of the water supply pipe 41 connected to the motor element 40 and to transmit the detected flow rate signal back to the control element 10.

The water pressure sensor element 60 is electrically connected to the control element 10 and power supply 80. It is used to detect the pressure value of the water supply pipe 41 connected to the motor element 40 and to transmit the detected pressure signal back to the control element 10.

The Bluetooth element 70 is electrically connected to the control element 10 and power supply 80. It is used to facilitate mutual communication and signal transmission between the control element 10 and the mobile device 300.

The power supply 80 is electrically connected to the control element 10, PWM element 20, relay 30, motor element 40, water flow sensor element 50, water pressure sensor element 60, and Bluetooth element 70 to provide electrical power for their operation.

The water reservoir 100 is used to store fluid and is connected to the water supply pipe 41 of the motor element 40.

The simulated body 200 is made of silicone material. It is equipped with a wound 201. The simulated body 200 is also connected to the water supply pipe 41 of the motor element 40, allowing the fluid from the water supply pipe 41 to be discharged from the wound 201 to simulate bleeding effects.

Through the above structure, relevant control values can be set using the mobile device 300. For example, the fluid output per minute for arterial bleeding (e.g., 150 cc), venous bleeding (e.g., 100 cc), microvascular bleeding (e.g., 30 cc), or random bleeding can be set. Additionally, the output frequency of the PWM element 20, relay 30, and motor element 40 can also be set to simulate predetermined bleeding amounts, bleeding speeds, etc., in addition to setting the hemostasis pressure value and the safe fluid output value. Then, as shown in FIG. 2, the mobile device 300 sends the set control signals, and the control element 10 receives the set control signals from the mobile device 300 via the Bluetooth element 70 and transmit these control signals to the PWM element 20, relay 30, and motor element 40. The motor element 40 operates according to the control signals. Then, the fluid from the water reservoir 100 is transported to the simulated body 200 based on the settings and flows out from the wound 201 on the simulated body 200 to simulate human bleeding effects. By controlling the timing sequence of the PWM element 20 and relay 30, the motor element 40 can simulate varying fluid output corresponding to heartbeat frequency, intermittently exporting fluid from the wound 201 on the simulated body 200. Furthermore, the water flow sensor element 50 and water pressure sensor element 60 of the present invention promptly transmit the detected flow rate and pressure signals to the control element 10. The control element 10 uses the Bluetooth element 70 to promptly transmit to the mobile device 300, allowing the mobile device 300 to display the current flow rate and pressure in real-time and determine whether the overall flow rate exceeds the set safe fluid output value.

Next, trainees can perform hemostasis on the wound 201 of the simulated body 200 (e.g., direct pressure hemostasis, pressure bandage hemostasis, etc.) to prevent fluid from being discharged from the wound 201. At this time, the water flow sensor element 50 and water pressure sensor element 60 detect the flow rate and pressure, and transmit the flow rate and pressure signals to the control element 10 for assessment. When the control element 10 determines that the pressure signal has reached the hemostasis pressure value and has been maintained for a certain period, and the fluid flow rate has indeed decreased, the control element 10 then controls the motor element 40 to stop delivering fluid to the simulated body 200. It also uses the Bluetooth element 70 to transmit a signal indicating successful hemostasis, as well as the fluid output amount, to the mobile device 300 for recording, display, and instructs the motor element 40 and a servo motor 90 (see below) to stop, completing the hemostasis exercise. Then, the motor element 40 recirculates the fluid already delivered back to the water reservoir 100 for reuse.

If a trainee attempts to stop bleeding from the wound 201 of the simulated body 200, the water flow sensor element 50 and water pressure sensor element 60 detect the flow rate and pressure and transmit the flow rate and pressure signals to the control element 10 for assessment. When the control element 10 determines that the pressure signal has not reached the hemostasis pressure value and the fluid flow rate has not changed, it continues to control the motor element 40 to deliver fluid to the wound 201 of the simulated body 200. When the set practice time is reached or the fluid output exceeds the set value, if the control element 10 still determines that the pressure signal has not reached the hemostasis pressure value and the fluid flow rate has not changed, it uses the Bluetooth element 70 to send a signal of unsuccessful hemostasis, as well as the fluid output amount, to the mobile device 300 for recording and display. However, the training system will continue to function normally until personnel suspend it via the Bluetooth element 70 to complete the hemostasis exercise. Then, the motor element 40 recirculates the fluid already delivered back to the water reservoir 100 for reuse.

Alternatively, the present invention may further include a servo motor 90, which is electrically connected to the control element 10 and power supply 80. The servo motor 90 can simulate the pulsating of a pulse according to the control of the control element 10.

When the hemostasis exercise begins, the servo motor 90 is controlled by signals from the control element 10 to synchronize its operation with the motor element 40, which outputs fluid to simulate bleeding, thus simulating the pulsation. When a trainee applies a tourniquet to the wound 201 of the simulated body 200 for hemostasis practice, if the trainee operates correctly and the tourniquet indeed applies pressure to the wound 201 of the simulated body 200, the flow rate and pressure signals are sent to the control element 10 by the water flow sensor element 50 and water pressure sensor element 60. The control element 10 then determines whether the pressure signal has reached the hemostasis pressure value and has been maintained for a certain period, and also verifies if the fluid flow rate has decreased. If these conditions are met, the control element 10 stops the motor element 40 from delivering fluid to the simulated body 200 and halts the operation of the servo motor 90. At this point, the control element 10 uses the Bluetooth element 70 to send a signal indicating successful hemostasis and the fluid output amount to the mobile device 300 for recording and display. It also instructs the motor element 40 and servo motor 90 to stop, completing the correct hemostasis exercise.

If the trainee fails to correctly apply a tourniquet to the wound 201 of the simulated body 200, the water flow sensor element 50 and water pressure sensor element 60 will detect the flow rate and pressure signals and transmit them to the control element 10. The control element 10 then determines that the pressure signal has not reached the hemostasis pressure value and the fluid flow rate has not changed. In this case, the control element 10 continues to control the motor element 40 to deliver fluid to the wound 201 of the simulated body 200, and the servo motor 90 continues to operate. When the set practice time is reached or the fluid output exceeds the set value, if the control element 10 still determines that the pressure signal has not reached the hemostasis pressure value and the fluid flow rate has not changed, it uses the Bluetooth element 70 to send a signal of unsuccessful hemostasis, as well as the fluid output amount, to the mobile device 300 for recording and display. However, the system will continue to function normally until personnel suspend it via the Bluetooth element 70 to complete the hemostasis exercise. Then, the motor element 40 recirculates the fluid already delivered back to the water reservoir 100 for reuse.

Therefore, as described above, the present invention has the following advantages:

(1) Since the present invention is equipped with a PWM element 20 and relay 30, the motor element 40 can simulate real bleeding effects that vary in intensity and intermittency with heartbeat frequency. This increases the difficulty and challenge of hemostasis practice for trainees, thereby enhancing the success rate of hemostasis on actual wounds.

(2) The present invention includes a water flow sensor element 50 to detect fluid flow rate, which can accurately calculate blood output flow rates (e.g., arterial bleeding, venous bleeding, capillary bleeding, etc.) and display them in real-time on the mobile device 300. It also allows the control element 10 to determine whether the fluid output exceeds a safe value (e.g., 1500 milliliters), serving as a criterion for assessing whether the patient is at risk of major bleeding. Additionally, the water flow sensor element 50 can instantly transmit flow rate signals to the control element 10, which in turn sends them to the mobile device 300. This enables trainees to adjust processing speed in real-time based on current flow rate signals, thereby improving the accuracy and speed of hemostasis practice.

(3) Furthermore, the present invention includes a water pressure sensor element 60, which allows trainees to detect and assess pressure when applying pressure for hemostasis. The water pressure sensor element 60 transmits pressure signals to the control element 10 for assessment, thereby improving the accuracy and speed of hemostasis assessment. Similar to the water flow sensor element 50, the water pressure sensor element 60 can also transmit pressure signals to the control element 10 in real-time, which are then sent to the mobile device 300. This allows trainees to adjust the applied pressure in real-time based on current pressure signals, further enhancing the accuracy and completeness of hemostasis practice.

(4) Moreover, the present invention includes a servo motor 90, which is electrically connected to the control element 10, to simulate pulsating (e.g., radial artery, dorsalis pedis artery, etc.). When trainees practice applying a tourniquet to the lower extremities, it's often difficult to locate the dorsalis pedis artery located on the dorsum of the foot. Additionally, lower limb injuries often result in significant bleeding. Therefore, the servo motor 90 of the present invention can serve as a basis for trainees to determine whether hemostasis is correctly applied and to confirm cessation of pulsation. Compared to conventional hemostasis simulation systems that lack devices for simulating pulse pulsation, the present invention offers significant practical and progressive advantages.

(5) Furthermore, the motor element 40 of the present invention not only delivers fluid to the wound 201 of the simulated body 200 but also immediately recirculates the fluid discharged from the wound 201 for reuse. Trainees do not need to manually collect the fluid for reuse, saving time and effort and offering the advantage of immediate recirculation.

(6) Lastly, since the present invention utilizes Bluetooth element 70 to connect with the mobile device 300, it allows for real-time adjustments, setting relevant parameters, and control activation. It can also instantly display various detection values and record multiple data. Therefore, the present invention offers convenience, speed, and simplicity in control. It allows for storage of various numerical values and performance records, enabling trainees to adjust their hemostasis abilities accordingly.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A training system for hemorrhage treatment, comprising a control element, a pulse width modulation (PWM) element, a relay, a motor element, a water flow sensor element, a water pressure sensor element, a Bluetooth element, a power supply, and a simulated body; wherein the control element is electrically connected to the PWM element, water flow sensor element, water pressure sensor element, Bluetooth element, and power supply; the control element outputs control signals to the PWM element and receive signals transmitted by the water flow sensor element and the water pressure sensor element; the control element utilizes the Bluetooth element to mutually exchange signals with a mobile device;

the PWM element is electrically connected to the control element, relay, and power supply; the PWM element is used to receive control signals transmitted by the control element and to transmit the control signals to the relay;

the relay is electrically connected to the PWM element, motor element, and power supply; the relay is used to receive control signals transmitted by the PWM element and to control the motor element's operation based on the control signals;

the motor element is electrically connected to the relay and power supply; the motor element is also connected to the simulated body via a water supply pipe; the motor element transports fluid to the simulated body based on the control signals from the relay to simulate bleeding effects;

the water flow sensor element is electrically connected to the control element and power supply; the water flow sensor is used to detect a flow rate of the water supply pipe connected to the motor element and to transmit a detected flow rate signal back to the control element;

the water pressure sensor element is electrically connected to the control element and power supply; the water pressure sensor element is used to detect a pressure value of the water supply pipe connected to the motor element and to transmit a detected pressure signal back to the control element;

the Bluetooth element is electrically connected to the control element and power supply; the Bluetooth element is used to facilitate mutual communication and signal transmission between the control element and the mobile device; and the power supply is electrically connected to the control element, PWM element, relay, motor element, water flow sensor element, water pressure sensor element, and Bluetooth element to provide electrical power, wherein a servo motor is electrically connected to the control element and the power supply, and the servo motor simulates the pulsating of a pulse according to the control of the control element, wherein the operation of the motor element is controlled by the PWM element through the relay to transport fluid to the simulated body, while the servo motor is operable to simulate the pulsating.

2. The training system for hemorrhage treatment according to claim 1, further comprising a water reservoir; wherein the water reservoir is used to store fluid and is connected to the water supply pipe of the motor element; and fluid outputted from the simulated body is recirculated and transported back to the water reservoir by the motor element.

* * * * *